（12) United States Patent
Baumann et al.

(10) Patent No.: US 12,302,783 B2
(45) Date of Patent: May 20, 2025

(54) AUTONOMOUS MOBILE GREEN-AREA TREATMENT ROBOT

(71) Applicant: Andreas Stihl AG & Co. KG, Waiblingen (DE)

(72) Inventors: Simon Baumann, Rosenheim (DE); Markus Gassner, Koessen (AT); Clemens Gottinger, Kufstein (AT); Georg Duregger, Niederndorf (AT)

(73) Assignee: Andreas Stihl AG & Co. KG, Waiblingen (DE)

( * ) Notice: Subject to any disclaimer, the term of this patent is extended or adjusted under 35 U.S.C. 154(b) by 744 days.

(21) Appl. No.: 17/644,738

(22) Filed: Dec. 16, 2021

(65) Prior Publication Data
US 2022/0192091 A1 Jun. 23, 2022

(30) Foreign Application Priority Data
Dec. 17, 2020 (EP) .................... 20215166

(51) Int. Cl.
*A01D 34/74* (2006.01)
*A01D 34/00* (2006.01)
(Continued)

(52) U.S. Cl.
CPC ........... *A01D 34/74* (2013.01); *A01D 34/008* (2013.01); *A01D 75/20* (2013.01); *A01D 2101/00* (2013.01)

(58) Field of Classification Search
CPC .... A01D 34/74; A01D 34/008; A01D 34/828; A01D 75/20; A01D 2101/00
See application file for complete search history.

(56) References Cited

U.S. PATENT DOCUMENTS 4,224,785 A 9/1980 Hoch
8,234,848 B2 * 8/2012 Messina ............... A01D 34/008
56/17.1
(Continued)

FOREIGN PATENT DOCUMENTS

DE 10 2006 038 553 A1 2/2008
EP 2 783 563 A1 10/2014
(Continued)

OTHER PUBLICATIONS

German-language Extended European Search Report issued in European Application No. 20215166.8 dated Jun. 9, 2021 with partial English translation (six (6) pages).

*Primary Examiner* — Adam J Behrens
*Assistant Examiner* — Robert E Pezzuto
(74) *Attorney, Agent, or Firm* — Crowell & Moring LLP

(57) ABSTRACT

An autonomous mobile green-area treatment robot has a treatment tool, a protection device, and a height-adjustment device. A tool height of the treatment tool is adjustable. The protection device is configured to protect against access into the treatment tool. A protection height of the protection device is adjustable. The height-adjustment device is configured for the coupled adjustment of the tool height and the protection height together, such that a tool height adjustment value of the adjustment of the tool height and a protection height adjustment value of the adjustment of the protection height are different. A distance between the treatment tool and the protection device is changed.

15 Claims, 11 Drawing Sheets

(51) Int. Cl.
*A01D 75/20* (2006.01)
*A01D 101/00* (2006.01)

(56) References Cited

U.S. PATENT DOCUMENTS

| | | | |
|---|---|---|---|
| 11,172,609 B2 * | 11/2021 | Hahn | A01D 34/008 |
| 11,793,110 B2 * | 10/2023 | Watanabe | A01D 34/74 |
| 2002/0104300 A1 * | 8/2002 | Hunt | A01D 34/008 56/10.6 |
| 2016/0353657 A1 | 12/2016 | Cheng | |
| 2019/0307060 A1 | 10/2019 | Hong et al. | |

FOREIGN PATENT DOCUMENTS

| | | |
|---|---|---|
| EP | 3 047 719 A1 | 7/2016 |
| EP | 2 687 077 B1 | 12/2017 |
| JP | 5172466 B2 | 3/2015 |
| WO | WO 2018/133758 A1 | 7/2018 |

* cited by examiner

AUTONOMOUS MOBILE GREEN-AREA TREATMENT ROBOT

CROSS REFERENCE TO RELATED APPLICATION

This application claims priority under 35 U.S.C. § 119 from European Patent Application No. 20215166.8, filed Dec. 17, 2020, the entire disclosure of which is herein expressly incorporated by reference.

BACKGROUND AND SUMMARY OF THE INVENTION

The invention relates to an autonomous mobile green-area treatment robot.

The invention is based on the object of providing an autonomous mobile green-area treatment robot which has improved properties.

The invention achieves this object by the provision of an autonomous mobile green-area treatment robot with the features of the independent claim. Advantageous refinements and/or embodiments of the invention are described in the dependent claims.

The in particular electric, autonomous mobile green-area treatment robot according to the invention comprises or has an in particular mechanical treatment tool, an in particular mechanical protection device, and an in particular mechanical height-adjustment device. A tool height, in particular a value of the tool height, of the treatment tool is adjustable. The protection device is designed or configured for in particular mechanical protection against access into the treatment tool, in particular by a human or animal. A protection height, in particular a value of the protection height, of the protection device is adjustable. The height-adjustment device is designed or configured for the coupled, in particular simultaneous adjustment of the tool height and the protection height together, such that an in particular spatial tool height adjustment value of the adjustment of the tool height and an in particular spatial protection height adjustment value of the adjustment of the protection height, in particular over at least a portion of a respective in particular spatial adjustment range of the adjustment of the tool height and the protection height, are different, in particular great. In addition, the height-adjustment device is designed or configured for the coupled adjustment of the tool height and the protection height together, such that a distance, in particular a value of the distance, or a spacing or interval between the treatment tool and the protection device, is changed or changes.

The adjustment of the tool height of the treatment tool allows a desired treatment of an area, in particular an area to be treated, in particular a desired growth height of the plants on the area.

The adjustment of the protection height of the protection device allows adaptation of the protection device and/or an adapted protection by the protection device to the treatment tool, in particular the tool height.

The coupled adjustment of tool height and the protection height together allows the green-area treatment robot to be user-friendly and/or relatively safe, in particular in contrast to a green-area treatment robot not according to the invention and without a coupled adjustment of the tool height and the protection height together.

The fact that the tool height adjustment value of the adjustment of the tool height and the protection height adjustment value of the adjustment of the protection height are different, or the different height adjustment, allows optimum adaptation of the protection device to the treatment tool and optimum protection by the protection device, in particular in contrast to an adjustment not according to the invention, in which a tool height adjustment value and a protection height adjustment value are not different or are the same. In particular, a same adjustment, if the position of the tool height is too low or too small or too deep, can lead to too low or too small or too deep a position of the protection height, and hence negatively influence a treatment by the treatment tool; and/or a same adjustment, if the position of the tool height is too large or too high, can lead to too high or too large a position of the protection height and hence negatively influence a protection by the protection device.

Changing the distance between the treatment tool and the protection device allows simplicity and hence a low cost of construction or design of the green-area treatment robot.

In particular, the term "autonomous mobile green-area treatment robot" means that the green-area treatment robot may be configured to move automatically, independently, self-determinedly, self-controlledly, self-guidedly and/or independently of a user, in particular on the area, which may be predefined and/or limited, and/or to treat automatically, independently, self-determinedly, self-controlledly, self-guidedly and/or independently of a user, in particular on the area, in particular to start and/or end the treatment or treating, in particular by means of the treatment tool. In addition or alternatively, the green-area treatment robot may be a gardening machine.

The area may for example be an open area, in particular an unsealed ground, or a green area such as a meadow with grass.

The treatment tool may be configured to treat the area, in particular the plants. Additionally or alternatively, the treatment tool may comprise, in particular may be a cutting tool. In particular, the tool height may be a cut height of the cutting tool.

The green-area treatment robot may have a tool drive motor for driving the treatment tool. In particular, a motor height of the tool drive motor may be adjustable, in particular fixedly coupled to the tool height of the treatment tool.

The tool height may be adjustable in an adjustment range between 0 cm (centimetre), in particular 2 cm, up to 20 cm, in particular 15 cm, in particular 10 cm, and/or be adjustable in at least three stages or steplessly. In addition or alternatively, the tool height may be a height of a lower edge of the treatment tool.

The protection height may be adjustable in an adjustment range between 1 cm (centimetre), in particular 3 cm, up to 14 cm, in particular 9 cm, and/or be adjustable in at least three stages or steplessly. In addition or alternatively, the protection height may be a height of a lower edge of the protection device.

The tool height adjustment value and the protection height adjustment value may differ by at least 1 cm, in particular 2 cm, in particular at least 5 cm, and/or at least 10% (percent), in particular at least 20%, in particular at least 50%. In addition or alternatively, the tool height adjustment value and the protection height adjustment value need not or may not be the same, in particular not proportional to one another.

The distance may be measured between an end, in particular the lower edge, of the treatment tool and a nearest end, in particular the lower edge, of the protection device. In addition or alternatively, the distance may be the length of the shortest connection between the treatment tool, in particular its end and/or lower edge, and the protection device, in particular its end and/or lower edge.

The in particular respective lower edge may be closest to a travel plane of the green-area treatment robot.

In a refinement of the invention, the green-area treatment robot defines and/or has an in particular horizontal travel plane. The tool height and the protection height are above the travel plane, in particular in a direction orthogonal, in particular vertical, thereto. In particular, the green-area treatment robot may have running wheels for movement or for moving the green-area treatment robot, in particular over the area, wherein the running wheels may define the travel plane.

In a refinement of the invention, the height-adjustment device is designed or configured such that the tool height adjustment value is greater than the protection height adjustment value. This allows a particularly optimal adaptation of the protection device to the treatment tool, and a particularly optimised protection by the protection device.

In a refinement of the invention, the protection device is arranged in front of the treatment tool, in particular in an in particular horizontal direction from a front to a rear of the green-area treatment robot. On an in particular mainly forward movement or an in particular mainly backward movement of the green-area treatment robot, this allows protection by the protection device against access into the treatment tool. In particular, the green-area treatment robot may have drive wheels for driving or drive of the green-area treatment robot, in particular on the area, wherein the drive wheels may be arranged closer to the rear than the front, in particular in the region of the rear, in particular at the rear.

In a refinement of the invention, the green-area treatment robot defines or has a, in particular the and/or horizontal, travel plane. The treatment tool is designed or configured for movement, in particular rotation or turning, approximately, in particular precisely, parallel to the travel plane. This may allow treatment of the area, in particular the planting, in so-called free cutting processes without counter-blade.

In particular, the green-area treatment robot may have running wheels for movement of or moving the green-area treatment robot, in particular on the ground, wherein the running wheels may define the travel plane. Alternatively or additionally, a rotational axis of the treatment tool may be approximately orthogonal to the travel plane. Further additionally or alternatively, approximately parallel may mean a deviation, in particular an angular deviation, of maximum 10° (degrees), in particular maximum 5°, in particular maximum 3°, and/or approximately orthogonal may mean a deviation, in particular an angular deviation, of at least 80°, in particular at least 85°, in particular at least 87°. Further additionally or alternatively, the distance may be a distance between the treatment tool in a next and/or foremost movement position, in particular a rotary position, and the protection device.

In a refinement of the invention, the treatment tool has or comprises a lawn mowing tool, in particular is the lawn mowing tool. The tool height is a mowing height of the lawn mowing tool. The coupled adjustment of the tool height in the form of the mowing height and the protection height together, with the different tool height adjustment value and protection height adjustment value, allows optimised mowing of the plants, in particular grass, in particular Southern State grasses of the United States of America, such as e.g. St. Augustine with its lateral offshoots. In particular, in the case of a great or high mowing height, simple entry or infeed of the plants into the lawn mowing tool, and/or in the case of a low or small or deep mowing height, sufficient ground clearance, in particular from stolons, is possible, in particular hence pressing down can be avoided. In addition or alternatively, the plant height may be a grass height. Further additionally or alternatively, the green-area treatment robot may be a lawn mowing robot, in particular a mulch mowing robot. Further additionally or alternatively, the lawn mowing tool may be configured for mowing the area, in particular the plants, in particular grass. Further additionally or alternatively, the lawn mowing tool may have or comprise at least one cutting thread, at least one plastic blade, at least one metal blade and/or a metal cutting blade with at least one cutting edge and/or with at least one cutting tooth.

In a refinement of the invention, the protection device has a comb which is oriented in particular downward, in particular in the direction of the travel plane, in particular vertically, and/or is open at the bottom, in particular in the direction of the travel plane. The protection height is a comb height, in particular of a lower edge of the comb. This allows good protection against access, in particular by a human or animal, into the treatment tool, and/or allows good entry or infeed of the plants into the treatment tool and/or a straightening of the plants and hence good cutting or a good cut of the plants. In particular, the comb may be an access protection and/or a carrier comb and/or lawn or grass comb. In addition or alternatively, the comb may have in particular mutually parallel tines or ribs, wherein in particular the tines may be oriented downward. In particular, the comb height may be a tine height, in particular of the lower tine ends, of the tines, and/or the lower edge of the comb may be defined by, in particular lower, tine ends of the tines. Further additionally or alternatively, the distance may be a distance between the treatment tool and the comb, in particular its lower edge. Further additionally or alternatively, the comb may be oriented approximately, in particular precisely, from the right, in particular from a right side, to the left, in particular to a left side, of the green-area treatment robot, or orthogonally to the direction from the front to the rear of the green-area treatment robot.

In a refinement of the invention, the height-adjustment device comprises or has a height adjustment coupling mechanism. The height adjustment coupling mechanism is designed or configured for in particular direct mechanical coupling of the treatment tool and the protection device, in particular together, for the coupled adjustment of the tool height and the protection height together. This allows the green-area treatment robot to be constructed or designed particularly safely and/or simply and hence economically.

In an embodiment of the invention, the height adjustment coupling mechanism has or comprises in particular at least one, in particular one-sided or two-sided, lever for the coupled adjustment of the tool height and the protection height together. The green-area treatment robot has or comprises a treatment tool device. The treatment tool device has or comprises the treatment tool. The treatment tool device is in particular directly mechanically coupled to the in particular at least one lever with a tool spacing value from a rotary axis of the lever. The protection device is in particular directly mechanically coupled to the in particular at least one lever with a protection distance value from the rotary axis. The tool spacing value and the protection spacing value are different. This allows a simple mechanical coupling or transmission. In particular, the rotary axis may be in particular arranged or oriented approximately, in particular precisely, parallel to the in particular horizontal travel plane. In addition or alternatively, the rotary axis may be in particular arranged or oriented approximately, in particular precisely, from the right, in particular a right side, to the left, in particular a left side, of the green-area treatment robot, or orthogonally to the direction from the front to the rear of the green-area treatment robot. Further additionally or alternatively, the tool spacing value may be greater than the protection spacing value.

In an embodiment of the invention, the green-area treatment robot has or comprises a, in particular the, treatment tool device. The treatment tool device has or comprises the treatment tool. The height adjustment coupling mechanism has or comprises in particular at least one tool guide slot and in particular at least one protection guide slot for the coupled adjustment of the tool height and the protection height together. The in particular at least one tool guide slot and the in particular at least one protection guide slot are designed or configured for the coupled, in particular parallel and/or direct, adjustment, in particular displacement, in particular with a same guide slot adjustment value, together, along or in at least one, in particular the same guide direction, which is not parallel to the adjustment of the tool height and the protection height, in particular is orthogonal thereto, in relation to the treatment tool device and the protection device. The in particular at least one tool guide slot is configured for in particular direct and/or mechanical guiding, in particular adjustment, and/or is formed by the treatment tool device, in particular the adjustment thereof, and has or comprises in particular at least one tool guide course with at least one portion oblique to the adjustment of the tool height and the guide direction. The in particular at least one protection guide slot is configured for in particular direct and/or mechanical guiding, in particular adjustment, and/or is formed by the protection device, in particular the adjustment thereof, and has or comprises in particular at least one protection guide course with at least one portion oblique to the adjustment of the protection height and the guide direction. The in particular at least one tool guide course and the in particular at least one protection guide course are different, in particular over at least one, in particular the, portion of a respective course region, in particular large or high or long. This allows a complex mechanical coupling or transmission. In particular, the guide device may be in particular arranged approximately, in particular precisely, parallel to the in particular horizontal travel plane. In addition or alternatively, the guide device may in particular be arranged approximately, in particular precisely, parallel to the in particular horizontal direction from the front to the rear of the green-area treatment robot. Further additionally or alternatively, the tool guide slot and/or the protection guide slot may in particular each comprise a slot, a web or a groove.

In one embodiment of the invention, the tool guide slot and the protection guide slot are fixed relative to one another. In particular, the height adjustment coupling mechanism has or comprises in particular at least one plate. The plate has or comprises the tool guide slot and the protection guide slot. In addition or alternatively, the tool guide course and the protection guide course are in particular arranged in a same course plane. In particular, the course plane may be a plate plane of the plate.

In a refinement of the invention, the height adjustment coupling mechanism has in particular at least one carrier for the coupled adjustment of the tool height and the protection height together, and in particular at least one adjustment limiter, in particular a carrying limiter. The in particular at least one carrier is designed or configured, on adjustment of the tool height of the treatment tool, to carry with it, in particular directly and/or mechanically, the protection device for the adjustment of the protection height. The in particular at least one adjustment limiter is designed or configured to directly and/or mechanically limit the adjustment of the protection height, in particular the carrying, to in particular only one, in particular the, portion of an, in particular the, adjustment range of the adjustment of the tool height. Alternatively, the in particular at least one carrier is designed or configured, on adjustment of the protection height of the protection device, to carry with it, in particular directly and/or mechanically, the treatment tool for the adjustment of the tool height. The in particular at least one adjustment limiter is designed or configured to limit, in particular directly and/or mechanically, the adjustment of the tool height, in particular the carrying, to in particular only one, in particular the, portion of an, in particular the, adjustment range of the adjustment of the protection height. This allows simple mechanical coupling or transmission.

In a refinement of the invention, the green-area treatment robot has or defines a, in particular the and/or horizontal travel plane. The treatment tool and the protection device are mounted or arranged fixedly relative to one another, approximately, in particular precisely, parallel to the travel plane. This allows a simplicity and hence low cost of a design or construction of the green-area treatment robot and/or the change in distance between the treatment tool and the protection device, in particular because the tool height adjustment value and the protection height adjustment value are different. In particular, the green-area treatment robot may have running wheels for movement of or moving the green-area treatment robot, in particular on the area, wherein the running wheels may define the travel plane. In addition or alternatively, approximately parallel may mean a deviation, in particular an angular deviation, of maximum 10°, in particular maximum 5°, in particular maximum 3°.

In a refinement of the invention, the height-adjustment device has or comprises a user-actuatable control element for the coupled adjustment of the tool height and the protection height together. In addition or alternatively, the height-adjustment device has or comprises at least one, in particular only one, in particular single and/or electrical motor for the coupled adjustment of the tool height and the protection height together. In particular, the control element or the motor may be configured for mechanically coupling, in particular are mechanically coupled, to the treatment tool, in particular the treatment tool device, the protection device and/or the height adjustment coupling mechanism. In addition or alternatively, the height-adjustment device may have two motors for the coupled adjustment of the tool height and the protection height together, and an electric, in particular electronic control device. In particular, one of the motors may be configured for mechanical coupling, in particular may be mechanically coupled, to the treatment tool, and another of the motors may be configured for mechanical coupling, in particular may be mechanically coupled, to the protection device. Further additionally or alternatively, the control device may be configured for, in particular electrically coupled, in particular simultaneous, control of the motors. Further additionally or alternatively, the height-adjustment device may comprise an, in particular electric, user-actuatable input device for input, and/or an in particular electrical and/or wireless receiver device for receiving the tool height and/or protection height and/or a value corresponding to the tool height and/or protection height. In particular, the at least one motor may be configured for the coupled adjustment of the tool height and the protection height together depending on the input and/or reception.

Further advantages and aspects of the invention arise from the claims and the description of exemplary embodiments of the invention which are presented below with reference to the figures.

DETAILED DESCRIPTION OF THE DRAWINGS

Figure 1:
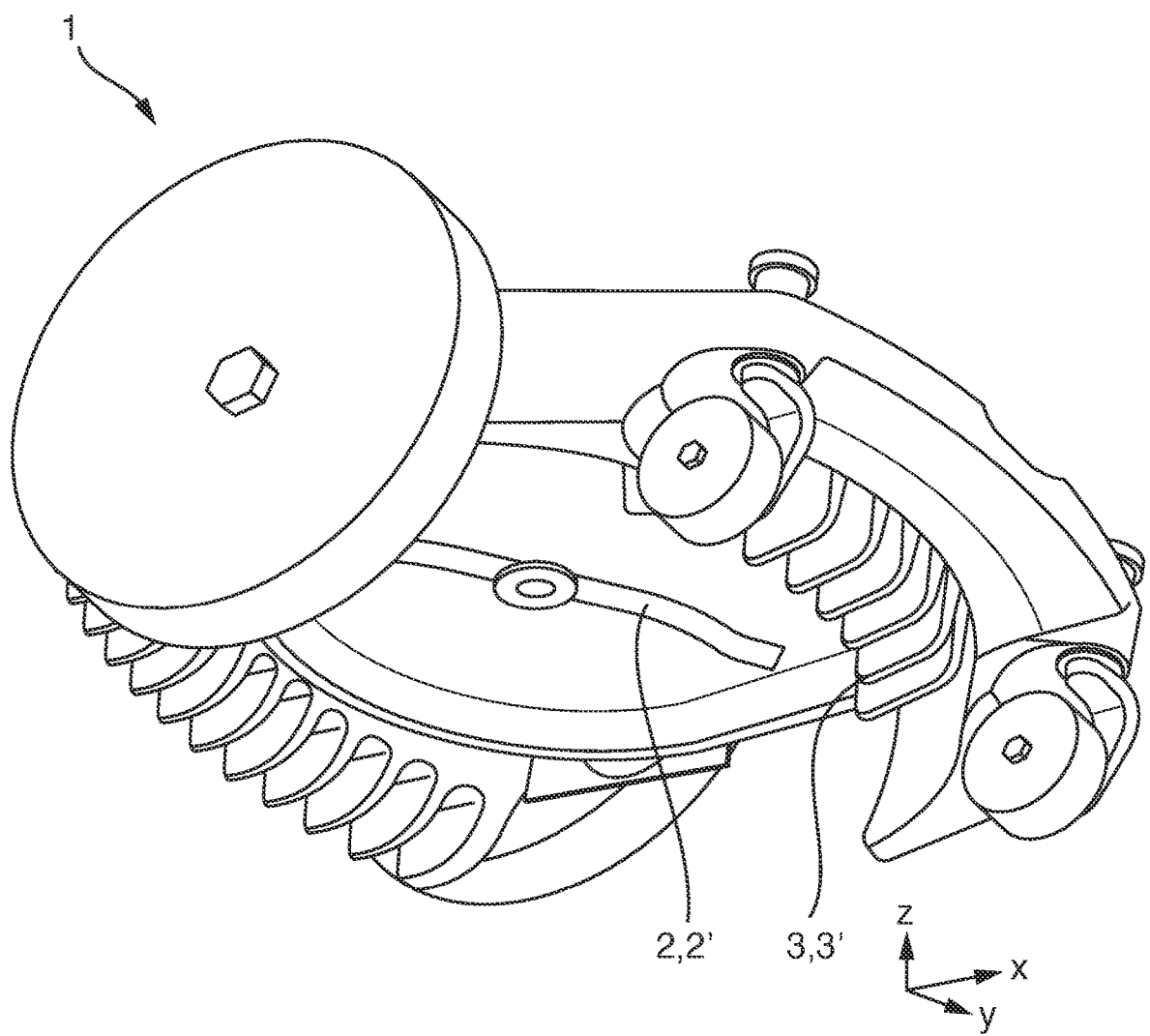
FIG. 1 is a perspective view of an autonomous mobile green-area treatment robot according to an embodiment of the invention, comprising a treatment tool, a protection device and a height-adjustment device for the coupled adjustment of a tool height of the treatment tool and a protection height of the protection device.
Figure 2:
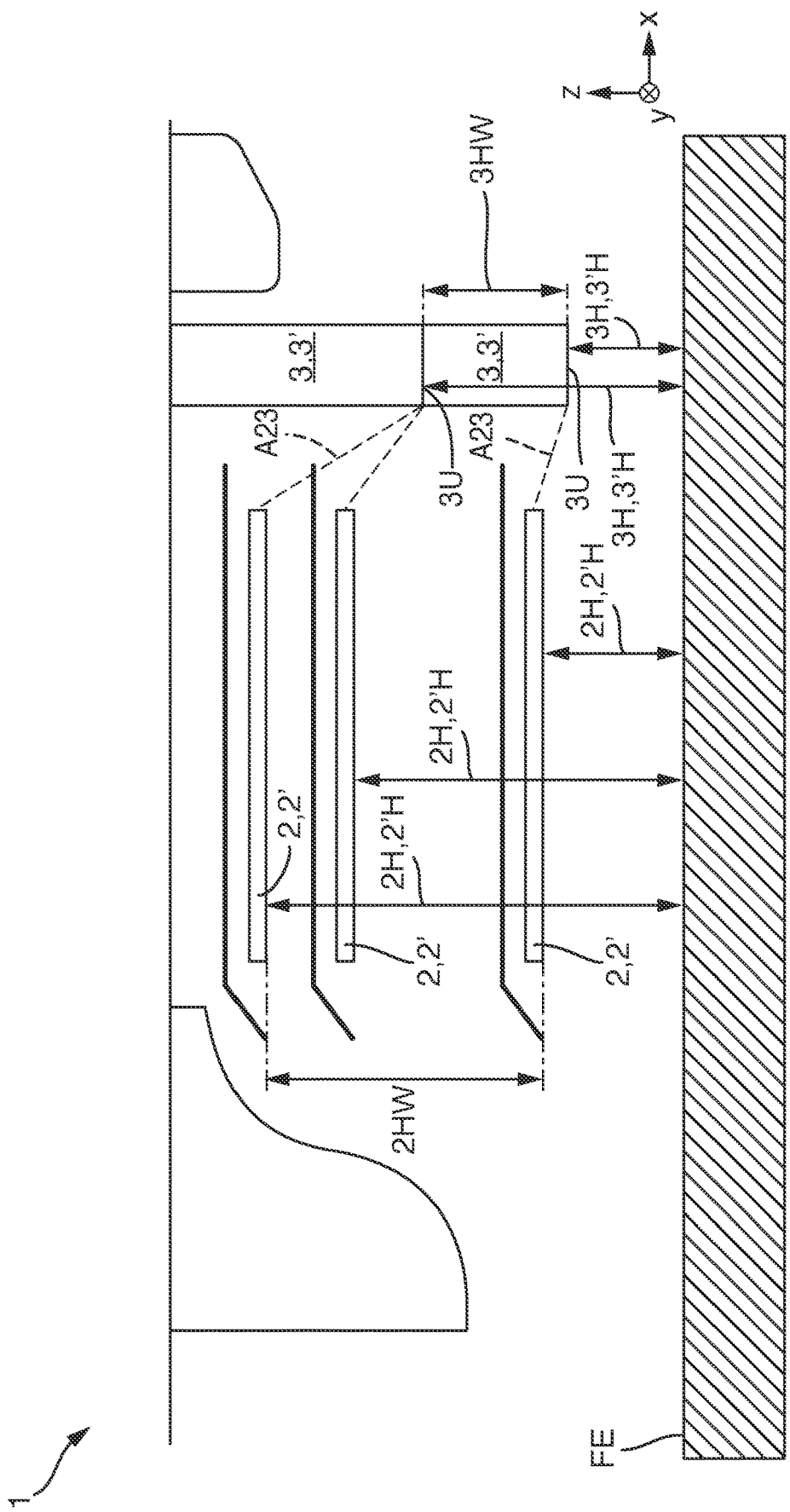
FIG. 2 is a schematic sectional side view of the green-area treatment robot with various tool heights and various protection heights.

FIGS. 1 and 2 show an autonomous mobile green-area treatment robot 1 according to the invention. The green-area treatment robot 1 has a treatment tool 2, a protection device 3 and a height-adjustment device 4, as shown in FIGS. 3 to 6, 7 to 10 and 11. A tool height 2H of the treatment tool 2 is adjustable, in particular is adjusted. The protection device 3 is configured for protection against access into the treatment tool 2, in particular is protected. A protection height 3H of the protection device 3 is adjustable, in particular is adjusted. The height-adjustment device 4 is configured for the coupled adjustment of the tool height 2H and the protection height 3H together, in particular is coupled and adjusted, such that a tool height adjustment value 2HW of the adjustment of the tool height 2H and a protection height adjustment value 3HW of the adjustment of the protection height 3H are different, and that a distance A23 between the treatment tool 2 and the protection device 3 is changed.

In detail, the green-area treatment robot 1 has a travel plane FE which is horizontal in the exemplary embodiments shown.

As FIG. 1 shows, the green-area treatment robot 1 has in particular four running wheels for moving the green-area treatment robot 1, wherein the running wheels define the travel plane FE.

Furthermore, in the exemplary embodiments, the tool height 2H and the protection height 3H lie above the travel plane FE in a direction z orthogonal, in particular vertical, to the travel plane FE.

Also, the height-adjustment device 4 is configured such that the tool height adjustment value 2HW is greater than the protection height adjustment value 3HW.

Furthermore, in the exemplary embodiments shown, the protection device 3 is arranged in front of the treatment tool 2 in an in particular horizontal direction −x from a front to a rear of the green-area treatment robot 1.

As shown in FIG. 1, the green-area treatment robot 1 has in particular two drive wheels, in particular the running wheels, for driving the green-area treatment robot 1, wherein the drive wheels are arranged closer to the rear than to the front.

As shown in FIGS. 1 and 2, the green-area treatment robot 1 has a front volume, wherein the front volume is arranged in front of and to the right and left of the protection device 3 and the treatment tool 2, and in particular is not height-adjustable. Also, the green-area treatment robot 1 has a rear volume or a diffuser or a ramp or a further protection device, in particular having a rear comb, wherein the rear volume is arranged behind and to the right and left of the treatment tool 2, and in particular is not height-adjustable. Furthermore, the running wheels are arranged in front of and behind, and to the right and left of the treatment tool 2. In particular, the drive wheels are arranged to the right and left of the treatment tool 2.

Also, the treatment tool 2 is configured to move, in the exemplary embodiment to rotate, approximately parallel to the travel plane FE, in particular it moves, in particular rotates.

Furthermore, the treatment tool 2 comprises a lawn mowing tool 2'. The tool height 2H is a mowing height 2'H of the lawn mowing tool 2'.

Also, the protection device 3 comprises a comb 3' which, in the exemplary embodiments shown, is oriented downward and/or open at the bottom. The protection height 3H is a comb height 3'H, in particular to a lower edge 3U of the comb 3'.

Furthermore, the treatment tool 2 and the protection device 3 are mounted fixedly relative to one another, approximately parallel to the travel plane FE or in the direction x.

In the exemplary embodiments shown, the green-area treatment robot 1 comprises a frame, in particular an undercarriage or subframe or chassis. The treatment tool 2 and the protection device 3 are arranged on the frame and mounted fixedly relative to one another by the frame, in particular approximately parallel to the travel plane FE or in the direction x. In particular, the running wheels are arranged on the frame.

Also, the height-adjustment device 4 has a user-actuatable control element 11 for the coupled adjustment of the tool height 2H and the protection height 3H together.

In alternative exemplary embodiments, the height-adjustment device may additionally or alternatively comprise at least one motor for the coupled adjustment of the tool height and the protection height together.

In the exemplary embodiments shown, the control element 11 is configured for mechanical coupling to the treatment tool 2 and hence to the protection device 3, in particular is mechanically coupled.

Furthermore, the height-adjustment device 4 has a height adjustment coupling mechanism 4'. The height adjustment coupling mechanism 4' is configured for mechanical coupling of the treatment tool 2 and protection device 3 for the coupled adjustment of the tool height 2H and the protection height 3H together, in particular is mechanically coupled and adjusted.

In the exemplary embodiments shown, the height adjustment coupling mechanism 4' is arranged on the frame.

In the exemplary embodiment shown in FIGS. 3 to 6, the height adjustment coupling mechanism 4' has an in particular one-sided lever 5 for the coupled adjustment of the tool height 2H and the protection height 3H together. In alternative exemplary embodiments, the height adjustment coupling mechanism may comprise a two-sided lever for the coupled adjustment of the tool height and the protection height together. The green-area treatment robot 1 has a treatment tool device 2". The treatment tool device 2" comprises the treatment tool 2. The treatment tool device 2" is mechanically coupled to the lever 5 with a tool spacing value A25W from a rotary axis A5 of the lever 5, which in the exemplary embodiment shown runs horizontally and/or parallel to the travel plane FE. The protection device 3 is mechanically coupled to the lever 5 with a protection spacing value A35W from the rotary axis A5. The tool spacing value A25W and the protection spacing value A35W are different.

In the exemplary embodiment shown, the tool spacing value A25W is greater than the protection spacing value A35W.

Also, the lever 5, in particular the rotary axis A5, is arranged, in particular mounted, on the frame.

Furthermore, the treatment tool device 2" is arranged, in particular mounted, on the frame.

Figure 3:
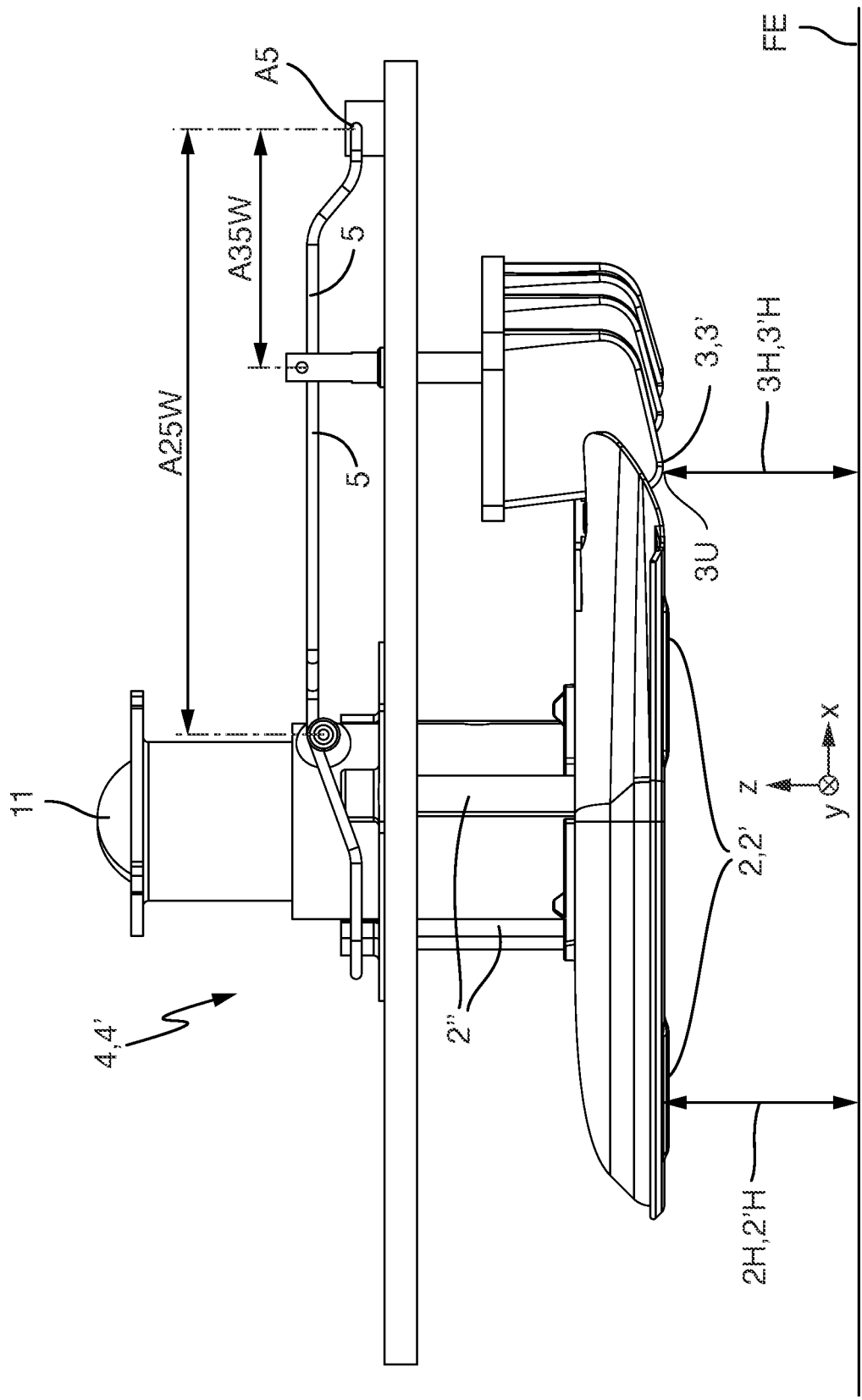
FIG. 3 is a schematic side view of the treatment tool, the protection device and the height-adjustment device having a lever for the coupled adjustment of the tool height and the protection height together, in a low position.
Figure 4:
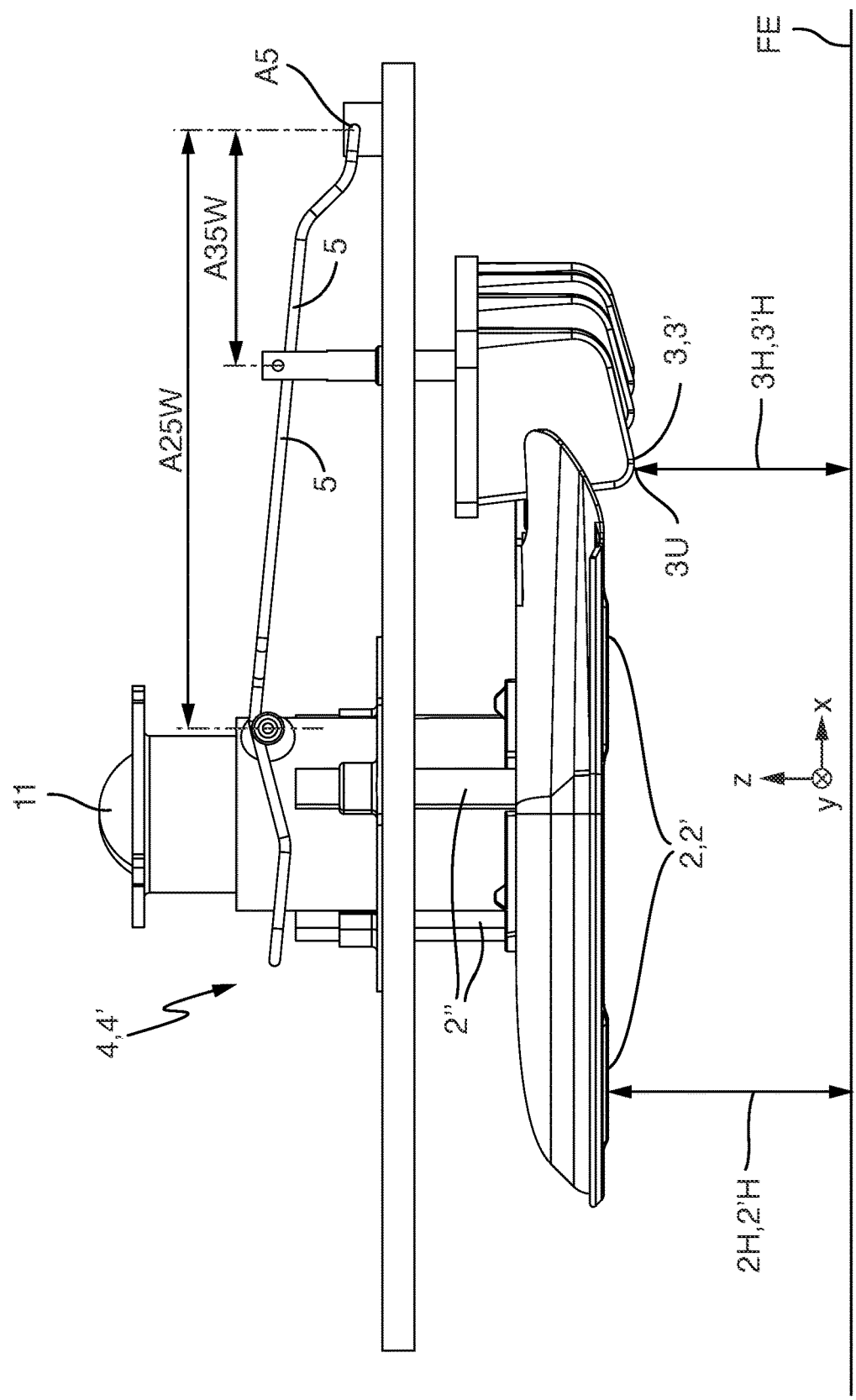
FIG. 4 is a further schematic side view of the treatment tool, the protection device and the height-adjustment device in FIG. 3, in an approximately middle position.
Figure 5:
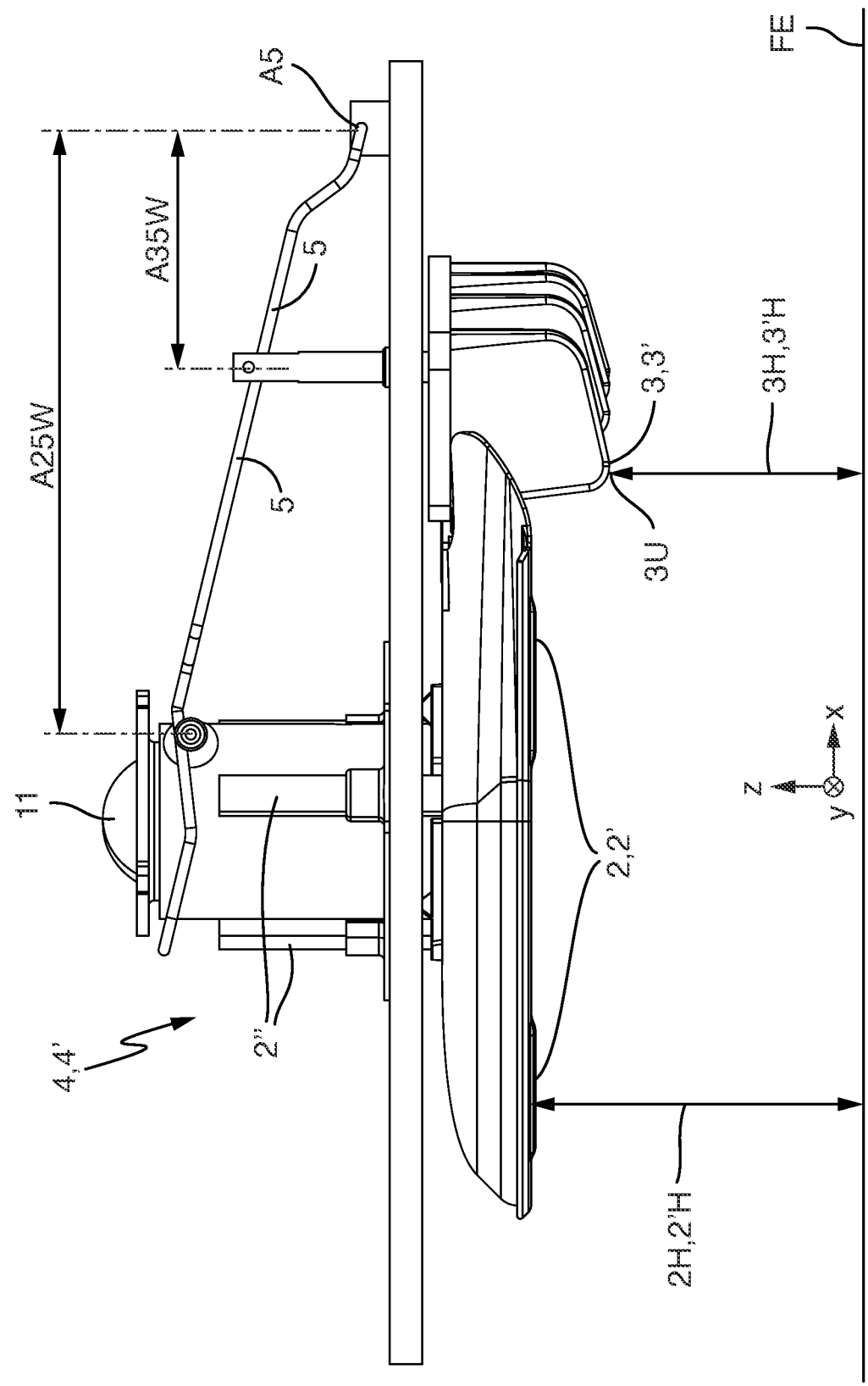
FIG. 5 is a further schematic side view of the treatment tool, the protection device and the height-adjustment device of FIG. 3, in a high position.
Figure 6:
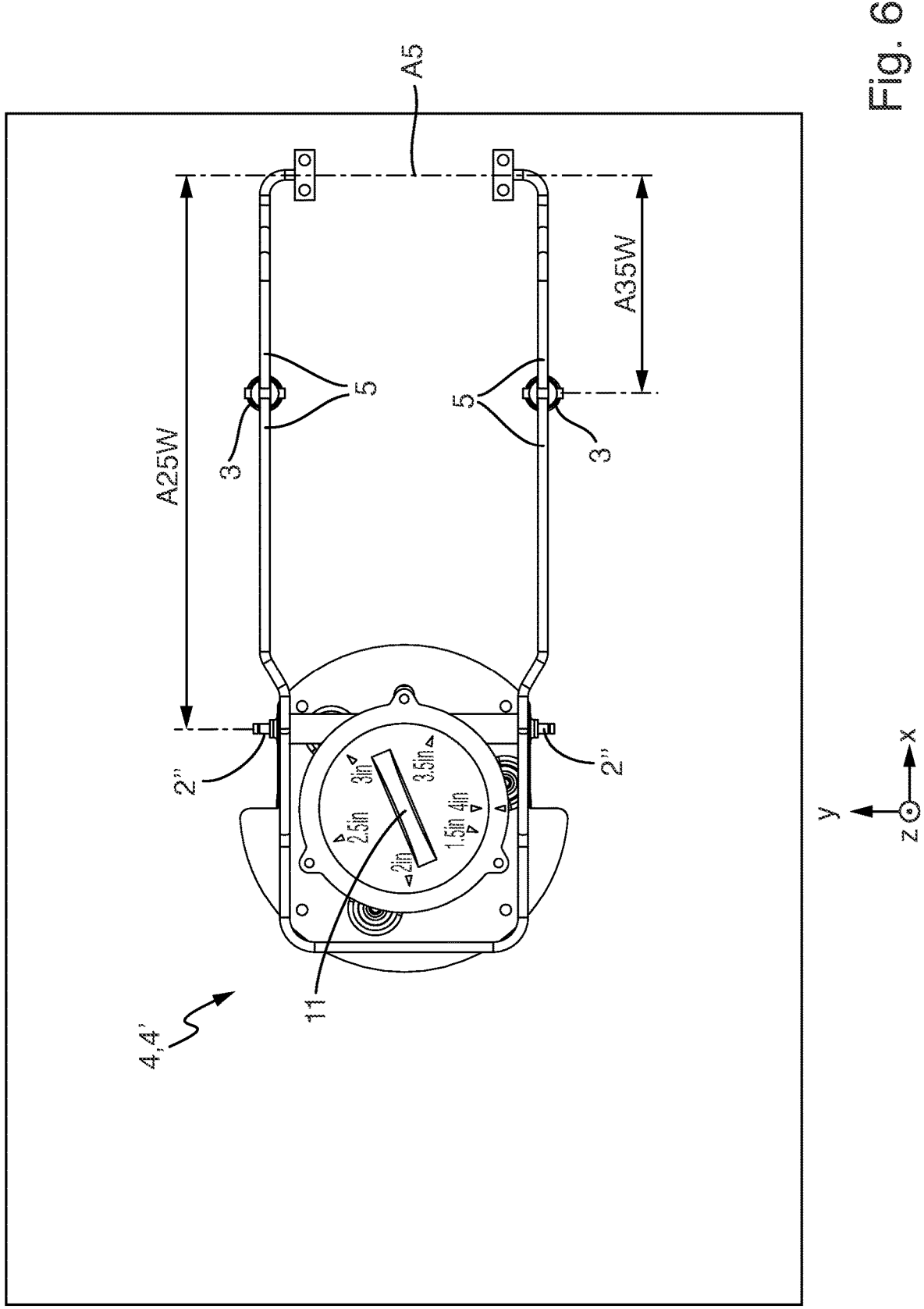
FIG. 6 is a schematic top view of the height-adjustment device in FIG. 3.

In detail, an actuation of the control element 11 causes the adjustment of the tool height 2H from the low position shown in FIG. 3, in particular 1.5" (inch) or 2.5 cm, through the middle position shown in FIG. 4, in particular 2.5" or 6.4 cm, up to the high position shown in FIG. 5, in particular 4" or 10.2 cm. The adjustment of the tool height 2H causes a rotation of the lever 5. The rotation of the lever 5 causes the adjustment of the protection height 3H from the low position shown in FIG. 3, in particular 3.3 cm, through the middle position shown in FIG. 4, in particular 4.7 cm, to the high position shown in FIG. 5, in particular 6.0 cm.

In the exemplary embodiment shown in FIGS. 7 to 10, the green-area treatment robot 1 comprises a treatment tool device 2". The treatment tool device 2" comprises the treatment tool 2. The height adjustment coupling mechanism 4' comprises a tool guide slot 6 and a protection guide slot 7 for the coupled adjustment of the tool height 2H and the protection height 3H together. The tool guide slot 6 and the protection guide slot 7 are configured for the coupled, in particular parallel adjustment, in particular displacement, in particular they are adjusted, in particular displaced, in particular with a same guide slot adjustment value 67W, together along at least one, in particular the same guide direction x which is not parallel to the adjustment of the tool height 2H and the protection height 3H, in particular is orthogonal thereto, relative to the treatment tool device 2" and the protection device 3. The tool guide slot 6 is configured for guiding and/or is formed by the treatment tool device 2", in particular is guided, and has a tool guide course 6V with at least one portion oblique to the adjustment of the tool height 2H and the guide direction x. The protection guide slot 7 is configured for guiding and/or is formed by the protection device 3, in particular guides, and has a protection guide course 7V with at least one portion oblique to the adjustment of the protection height 3H and the guide direction x. The tool guide course 6V and the protection guide course 7V are different.

In the exemplary embodiment shown, the tool guide course 6V is greater than the protection guide course 7V.

In detail, the tool guide slot 6 and protection guide slot 7 are fixed relative to one another. In the exemplary embodiment shown, the height adjustment coupling mechanism 4' comprises a plate 8. The plate 8 comprises the tool guide slot 6 and the protection guide slot 7.

In addition or alternatively, the tool guide course 6V and the protection guide course 7V run in a same course plane 67VE.

In the exemplary embodiment shown, the course plane 67VE is a plate plane of the plate 8.

Also, the plate 8 is arranged, in particular mounted, on the frame.

Furthermore, the treatment tool device 2" is arranged, in particular mounted, on the frame.

Figure 7:
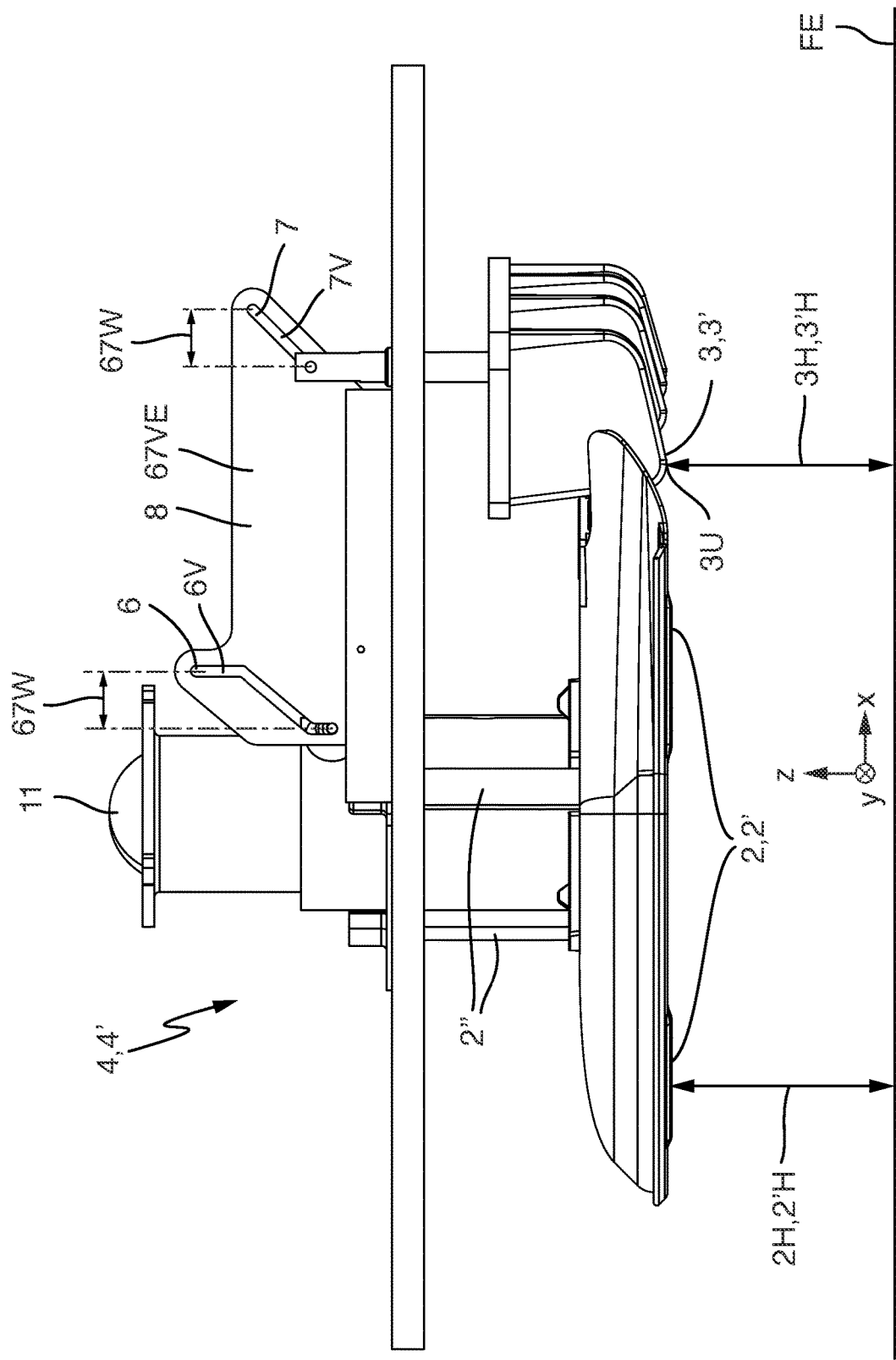
FIG. 7 is a schematic side view of the treatment tool, the protection device and the height-adjustment device, comprising a tool guide slot and a protection guide slot for the coupled adjustment of the tool height and the protection height together, in a low position.
Figure 8:
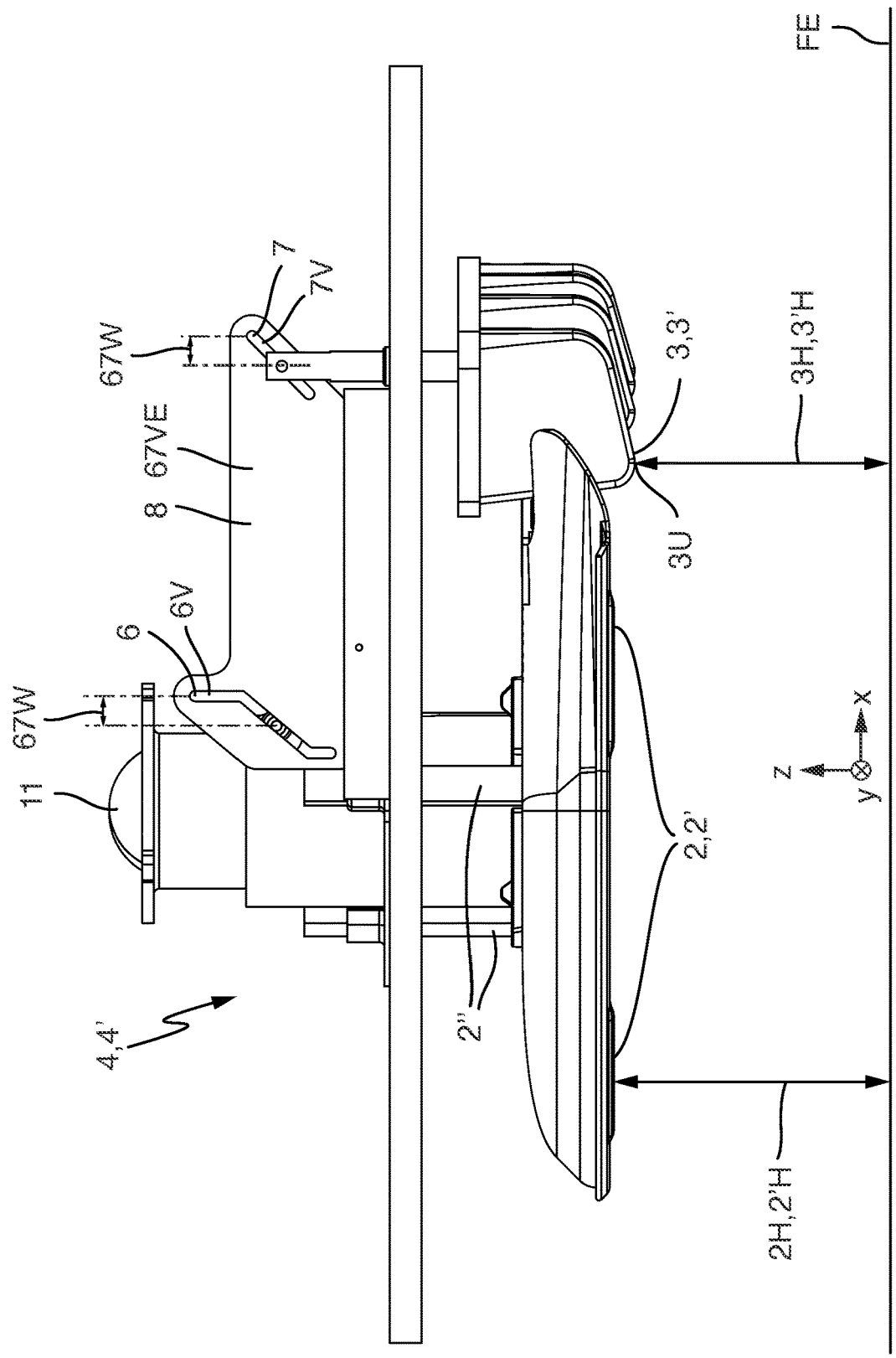
FIG. 8 is a further schematic side view of the treatment tool, the protection device and the height-adjustment device of FIG. 7, in an approximately middle position.
Figure 9:
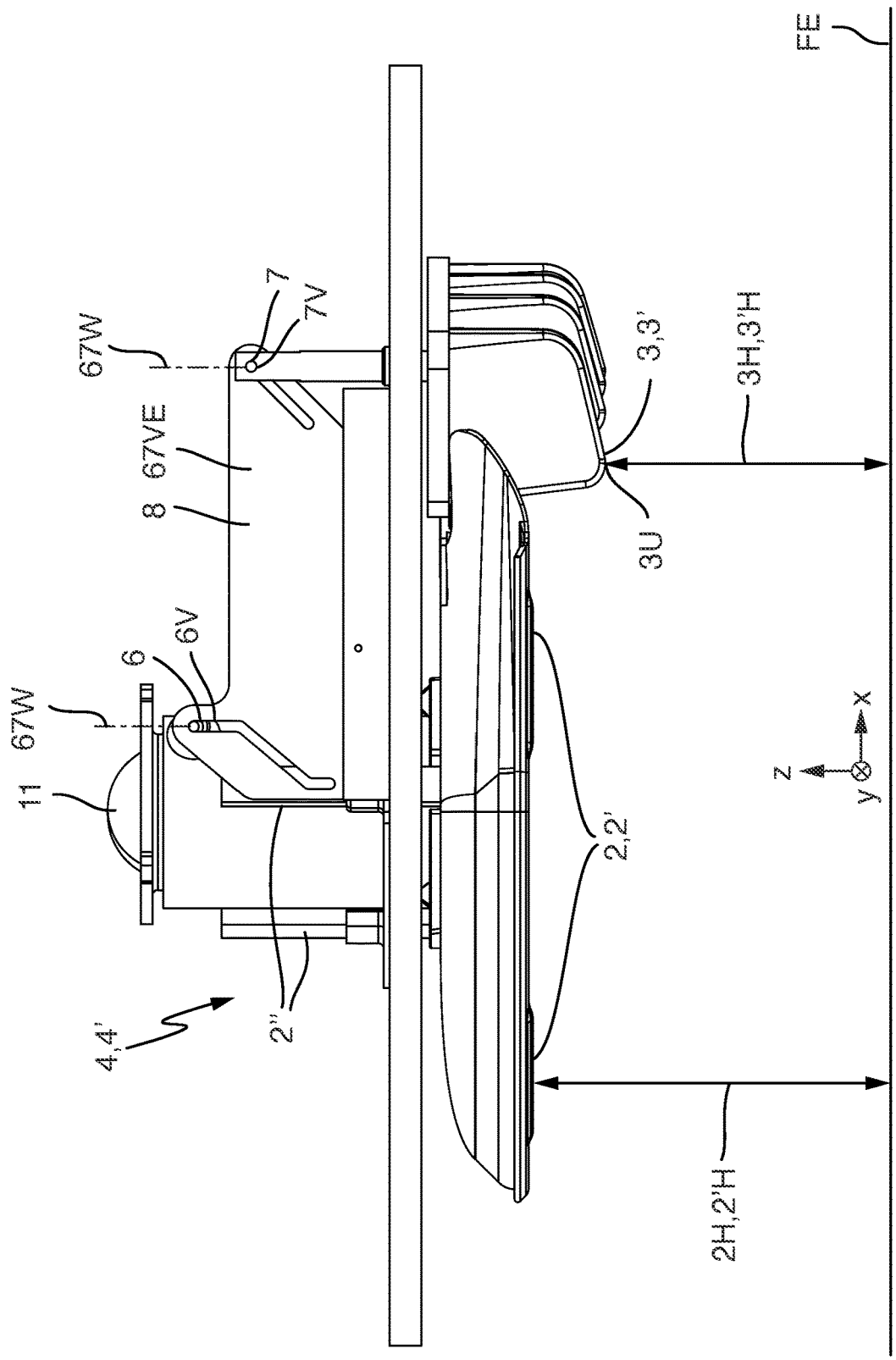
FIG. 9 is a further schematic side view of the treatment tool, the protection device and the height-adjustment device in FIG. 7, in a high position.
Figure 10:
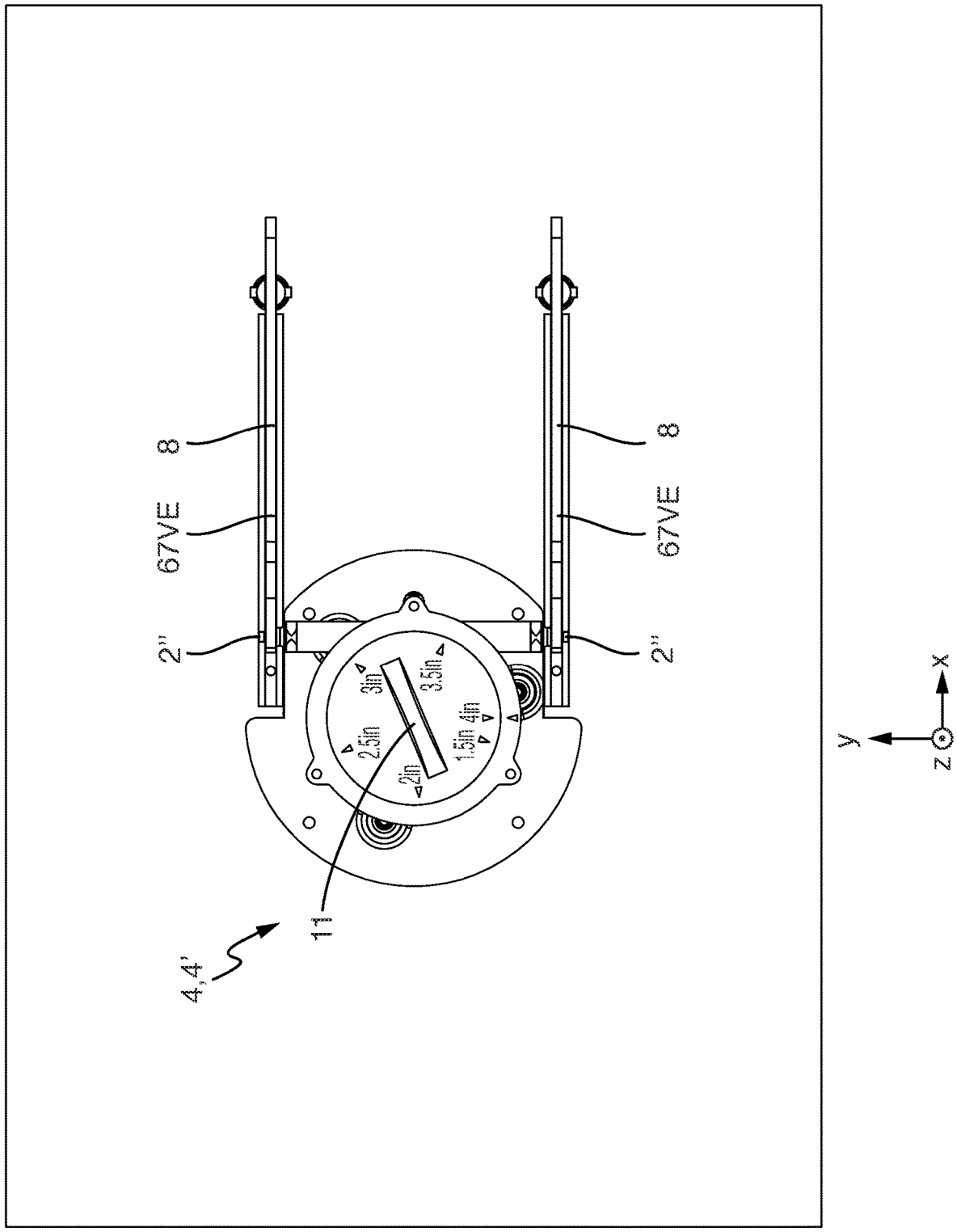
FIG. 10 is a schematic top view of the height-adjustment device in FIG. 7.

In detail, an actuation of the control element 11 causes an adjustment of the tool height 2H from the low position shown in FIG. 7, in particular 1.5" or 2.5 cm, through the approximately middle position shown in FIG. 8, in particular 2.5" or 6.4 cm, to the high position shown in FIG. 9, in particular 4" or 10.2 cm. The adjustment of the tool height 2H causes the adjustment, in particular the displacement, of the tool guide slot 6, in particular the plate 8, in the guide direction x. The adjustment of the tool guide slot 6 causes the adjustment, in particular the displacement, of the protection guide slot 7 in the guide direction x. The adjustment of the protection guide slot 7 causes the adjustment of the protection height 3H from the low position shown in FIG. 7, in particular 3.3 cm, through the approximately middle position shown in FIG. 8, in particular 4.7 cm, to the high position shown in FIG. 9, in particular 6.0 cm.

Figure 11:
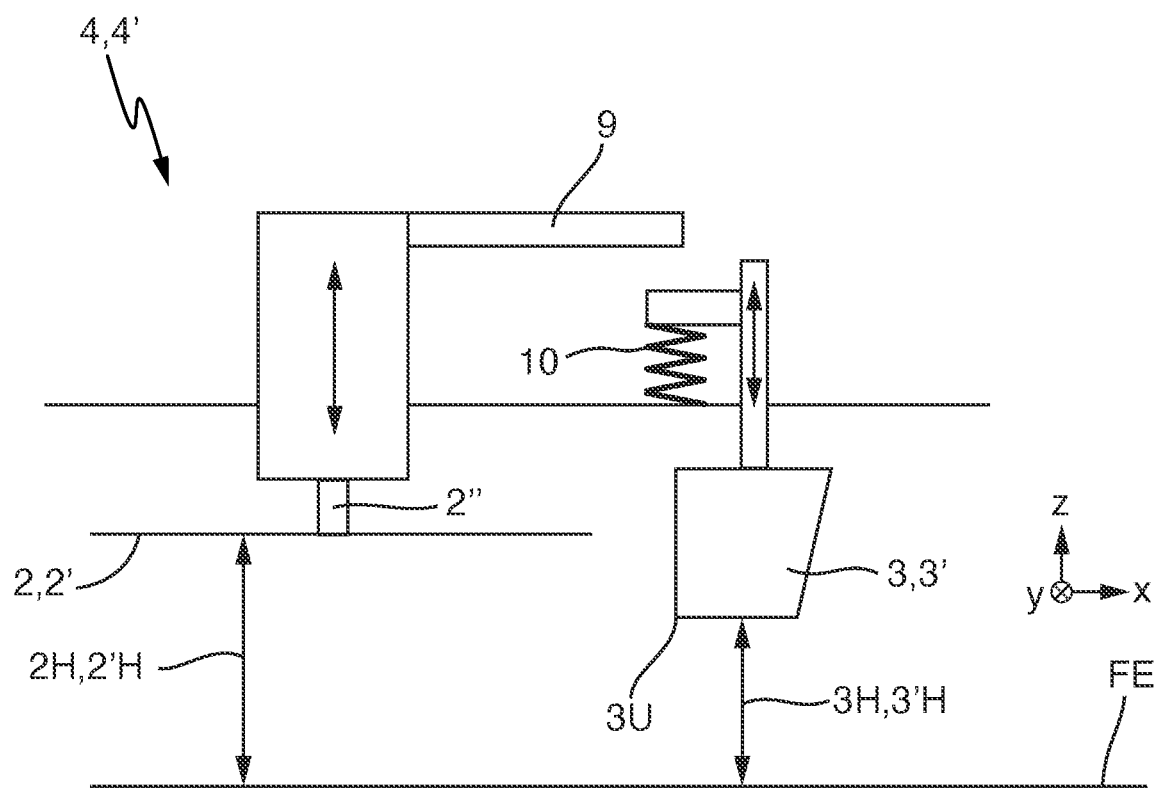
FIG. 11 is a schematic side view of the treatment tool, the protection device and the height-adjustment device, comprising a carrier for the coupled adjustment of the tool height and the protection height together.

In the exemplary embodiment shown in FIG. 11, the height adjustment coupling mechanism 4' comprises a carrier 9 for the coupled adjustment of the tool height 2H and the protection height 3H together, and an adjustment limiter 10.

In the exemplary embodiment shown, the carrier 9 is configured, on the adjustment of the tool height 2H of the treatment tool 2, to carry with it the protection device 3 for adjustment of the protection height 3H, in particular it carries this. The adjustment limiter 10 is configured to limit the adjustment of the protection height 3H to a portion of an adjustment range of the adjustment of the tool height 2H, in particular limits this.

In alternative exemplary embodiments, the carrier may be configured, on adjustment of the protection height of the protection device, to carry with it the treatment tool for adjustment of the tool height, in particular it carries this. The adjustment limiter may be configured to limit the adjustment of the tool height to a portion of an adjustment range of the adjustment of the protection height, in particular limits this.

In the exemplary embodiment shown, the green-area treatment robot 1 comprises a treatment tool device 2". The treatment tool device 2" comprises the treatment tool 2.

Also, the treatment tool device 2" is configured to carry with it the carrier 9, in particular carries this.

Furthermore, the treatment tool device 2" is arranged, in particular mounted, on the frame.

Also, the adjustment limiter 10 is arranged, in particular fixedly, on the frame.

In detail, an actuation of the control element 11 causes the adjustment of the tool height 2H. The adjustment of the tool height 2H causes an adjustment, in particular the carrying, of the carrier 9. The adjustment of the carrier 9 causes the carrying of the protection device 3, and hence the adjustment of the protection height 3H. The adjustment limiter 10 limits the adjustment of the protection height 3H of the protection device 3 to the portion of the adjustment range of the adjustment of the tool height 2H.

In the exemplary embodiment shown, the adjustment limiter 10 comprises a spring, in particular is the spring. In alternative exemplary embodiments, the adjustment limiter may additionally or alternatively be formed at least partially by the frame.

As the exemplary embodiments shown and explained above make clear, the invention provides an advantageous autonomous mobile green-area treatment robot which has improved properties.

What is claimed is:

1. An autonomous mobile green-area treatment robot, comprising:
    a treatment tool, wherein a tool height of the treatment tool is adjustable;
    a protection device, wherein the protection device is configured to protect against access into the treatment tool, and wherein a protection height of the protection device is adjustable; and
    a height-adjustment device, wherein the height-adjustment device is configured for coupled adjustment of the tool height and the protection height together, such that a tool height adjustment value of the adjustment of the tool height and a protection height adjustment value of the adjustment of the protection height are different, and such that a distance between the treatment tool and the protection device is changed, wherein
    the protection device has a comb, and
    the protection height is a comb height.

2. The green-area treatment robot according to claim 1, wherein
    the green-area treatment robot has a travel plane, and
    the tool height and the protection height are above the travel plane.

3. The green-area treatment robot according to claim 1, wherein
    the height-adjustment device is configured such that the tool height adjustment value is greater than the protection height adjustment value.

4. The green-area treatment robot according to claim 1, wherein
    the protection device is arranged in front of the treatment tool.

5. The green-area treatment robot according to claim 1, wherein
    the green-area treatment robot has a travel plane, and
    the treatment tool is configured for movement approximately parallel to the travel plane.

6. The green-area treatment robot according to claim 5, wherein
    the movement is a rotation approximately parallel to the travel plane.

7. The green-area treatment robot according to claim 1, wherein
    the treatment tool comprises a lawn mowing tool,
    the tool height is a mowing height of the lawn mowing tool.

8. The green-area treatment robot according to claim 1, wherein
    the comb is oriented downward or open at the bottom, and
    the protection height is the comb height of a lower edge of the comb.

9. The green-area treatment robot according to claim 1, wherein
    the green-area treatment robot has a travel plane, and
    the treatment tool and the protection device are mounted fixedly relative to one another, approximately parallel to the travel plane.

10. An autonomous mobile green-area treatment robot, comprising:
    a treatment tool, wherein a tool height of the treatment tool is adjustable;
    a protection device, wherein the protection device is configured to protect against access into the treatment tool, and wherein a protection height of the protection device is adjustable; and
    a height-adjustment device, wherein the height-adjustment device is configured for coupled adjustment of the tool height and the protection height together, such that a tool height adjustment value of the adjustment of the tool height and a protection height adjustment value of the adjustment of the protection height are different, and such that a distance between the treatment tool and the protection device is changed, wherein
    the height-adjustment device comprises a height adjustment coupling mechanism, and
    the height adjustment coupling mechanism is configured for mechanical coupling of the treatment tool and the protection device for the coupled adjustment of the tool height and the protection height together.

11. The green-area treatment robot according to claim 10, wherein
    the height adjustment coupling mechanism has a one-sided lever for the coupled adjustment of the tool height and the protection height together,
    the green-area treatment robot has a treatment tool device, wherein the treatment tool device comprises the treatment tool, and wherein the treatment tool device is mechanically coupled to the lever with a tool spacing value from a rotary axis of the lever,
    the protection device is mechanically coupled to the lever with a protection spacing value from the rotary axis, and
    the tool spacing value and the protection spacing value are different.

12. The green-area treatment robot according to claim 11, wherein
    the height adjustment coupling mechanism has a tool guide slot and a protection guide slot for the coupled adjustment of the tool height and the protection height together, wherein the tool guide slot and the protection guide slot serve for the coupled adjustment with a same guide slot adjustment value, together along at least one guide direction, which is not parallel to the adjustment of the tool height and the protection height in relation to the treatment tool device and the protection device,
    the tool guide slot is configured for guiding or is formed by the treatment tool device, and has a tool guide course with at least one portion oblique to the adjustment of the tool height and the guide direction,
    the protection guide slot is configured for guiding or is formed by the protection device and has a protection guide course with at least one portion oblique to the adjustment of the protection height and the guide direction, and the tool guide course and the protection guide course are different.

13. The green-area treatment robot according to claim 12, wherein the tool guide slot and the protection guide slot are fixed relative to one another, wherein the height adjustment coupling mechanism has a plate, wherein the plate comprises the tool guide slot and the protection guide slot, or the tool guide course and the protection guide course run in a same course plane.

14. The green-area treatment robot according to claim 10, wherein the height adjustment coupling mechanism has a carrier for the coupled adjustment of the tool height and the protection height together, and an adjustment limiter, wherein the carrier is configured, on adjustment of the tool height of the treatment tool, to carry the protection device for the adjustment of the protection height, and wherein the adjustment limiter is configured to limit the adjustment of the protection height to a portion of an adjustment range of the adjustment of the tool height, or wherein the carrier is configured, on adjustment of the protection height of the protection device, to carry the treatment tool for the adjustment of the tool height, and wherein the adjustment limiter is configured to limit the adjustment of the tool height to a portion of an adjustment range of the adjustment of the protection height.

15. An autonomous mobile green-area treatment robot, comprising:

a treatment tool, wherein a tool height of the treatment tool is adjustable;

a protection device, wherein the protection device is configured to protect against access into the treatment tool, and wherein a protection height of the protection device is adjustable; and a height-adjustment device, wherein the height-adjustment device is configured for coupled adjustment of the tool height and the protection height together, such that a tool height adjustment value of the adjustment of the tool height and a protection height adjustment value of the adjustment of the protection height are different, and such that a distance between the treatment tool and the protection device is changed, wherein the height-adjustment device has a user-actuatable control element for the coupled adjustment of the tool height and the protection height together, or the height-adjustment device has at least one motor for the coupled adjustment of the tool height and the protection height together.

* * * * *